United States Patent [19]

Murakami et al.

[11] Patent Number: 5,656,370
[45] Date of Patent: Aug. 12, 1997

[54] OPTICAL RECORDING MEDIUM

[75] Inventors: Motoyoshi Murakami; Masahiro Birukawa, both of Hirakata, Japan

[73] Assignee: Matsushita Electric Industrial Co., Ltd., Japan

[21] Appl. No.: 457,157

[22] Filed: Jun. 1, 1995

Related U.S. Application Data

[63] Continuation of Ser. No. 143,044, Oct. 29, 1993, abandoned.

[30] Foreign Application Priority Data

Oct. 29, 1992 [JP] Japan .................................. 4-291081

[51] Int. Cl.⁶ .................................. G11B 5/66; B32B 5/16
[52] U.S. Cl. .................................. 428/332; 428/336; 428/64.3; 428/64.9; 428/694 MM; 428/694 EC; 428/694 DE; 428/694 RL; 428/694 MT; 428/900; 369/13
[58] Field of Search .................................. 428/694 MM, 428/694 EC, 694 DE, 694 RL, 694 MT, 900, 332, 336, 64.3, 64.9; 363/13

[56] References Cited

U.S. PATENT DOCUMENTS 4,310,899  1/1982  Bresterbus et al. .................. 365/113
4,628,485  12/1986  Tanaka et al. .................. 365/122
4,814,238  3/1989  Tanaka et al. .................. 428/692

FOREIGN PATENT DOCUMENTS 258978   3/1988  European Pat. Off. .
60-7633  1/1985  Japan .
3-054741 3/1991  Japan .
3-105738 5/1991  Japan .

Primary Examiner—Leszek Kiliman
Attorney, Agent, or Firm—Wenderoth, Lind & Ponack

[57] ABSTRACT

An optical recording medium for recording, reading, erasing information with beams has a layer composed of a lower thermal conductivity material and a heat sink layer of a higher thermal conductivity material sequentially laminated on a reading and reading layer composed of at lest a recording thin film and a reading thin film. Therefore, an optical recording medium can be realized where the range of the recording power to be tolerated even in a case of a disk smaller in track pitch and the movement of the central position of the temperature distribution is small, namely, an optical recording medium where the recording power margin is large and the high density recording operation can be effected.

14 Claims, 6 Drawing Sheets

OPTICAL RECORDING MEDIUM

This application is a continuation of now abandoned application, Ser. No. 08/143,044, filed Oct. 29, 1993.

BACKGROUND OF THE INVENTION

The present invention generally relates to a recording medium of an optical reading and recording apparatus which is adapted to record, read or erase information with the use of optical means such as laser beams or the like.

The construction of the conventional optical disk substrate is basically shown in FIG. 9.

Reference numeral 41 is a plastic substrate, such as polycarbonate, polyolefin, acryl, epoxy resins or the like, provided with grooves for tracking guide of optical spots. A dielectric layer 42 of $SiO_2$, ZnS or the like, a reading and recording layer 43 of TbFeCo, DyFeCo or the like, and a protective layer 44 of $2MgO.SiO_2$, $ZnS.SiO_2$, SiN or the like are laminated sequentially on the plastic substrate. An overcoat layer 45 of epoxide acrylate, epoxy resin, acrylic resin or the are further coated on it. A hard coat layer 46 of epoxy acrylate, epoxy resin, acrylic resin or the like are further coated on the beam incident on the side of the plastic substrate 41.

When the reading and recording layer 43 of TbFeCo, DyFeCo or the like is as small as 50 nm or lower in film thickness, a reflection layer composed of Al, Cu or the like is provided between the reading and recording layer 43 and the protective layer 44 so as to increase the reflection light intensity.

An optical recording medium as described hereinabove is heated to approximately a temperature resulting in smaller local coercive force or near a compensation temperature of approximately curie temperature or by the laser beam irradiation upon a perpendicular magnetization film, in a case of a magneto-optical recording medium using a perpendicular magnetization film having a magnetic optical effect as the reading and recording layer 43, so as to magnetize it in the direction of a bias field for effecting a thermomagnetic recording operation. In order to effect a reading operation of the recording signal, a laser beam smaller in intensity than the laser beam at a recording and erasing time is irradiated and the rotation (magnetic optical effects of so-called kerr effect and faraday effect) of a polarization plane of reflection beams or transmission beams are detected, in accordance with a direction of the magnetization of the perpendicular magnetization film, as the intensity variation of the beams with the use of an analyzer.

In a case of an optical disk where a phase-change optical recording medium and an organic material are used for the reading and recording layer 43, optical beams are similarly irradiated upon the medium so as to cause local temperature rises or chemical variation by optical absorption. In order to read the signal, optical beams different in intensity or wavelength from a recording time are irradiated in local change on the medium caused by the recording operation so as to detect the reflection beams or the transmission beams.

Further, as a method of effecting a high density reading and recording operation, a high density reading and recording operation of 0.6 µm or lower in reading domain length along by track can be effected from one portion of a temperature raised portion of spots of laser beams by the use of an exchange coupled multi-layer film of rare-earth-transition-metal alloy system thin film in a reading and recording layer 43. (Japanese Patent Laid-Open Publication Hei No. 3-93056, Japanese Patent Laid-Open Publication Hei No. 3-93058.)

A reproducing principle by a super resolution system (hereinafter referred to as RAD system) called RAD will be described briefly in a case where high density reading operation is effected with the use of reading and recording layer 43 composed of exchange coupled two layer films of a recording film a reading film for making a reading signal amount of 0.6 µm or lower in domain length as one example. In the RAD system, an initial magnetic field is disposed immediately before the laser spot and the magnetization direction of the reading film is arranged in a direction of the initial magnetic field. At this time, the reading film operates as a mask. When a disk is rotated so as to pass a laser spot at the reading time, the temperature of the read film rises gradually and a high temperature area behind the laser spot is considerably lowered in the coercive force of the reading layer. When the total of the exchange coupling force with respect to the read film and the bias field at the reading time becomes larger than the coercive force of the reading layer, the magnetization of the recording film is copied. Information of a recording film is read from a portion out of a mask of the reading layer. A direction of a bias field is a direction opposite to the initial field. After the laser beams have passed, the temperature of the reading and recording layer is lowered. So the domain of the recording film is copied on the reading layer so as to return to the original condition. In the magneto-optical recording medium of this construction, the recording and reading operations of 0.5 µm or lower in domain length can be effected.

An optical recording medium of such conventional construction has a problem in that a recording power range to be tolerated is small, because crosstalks with respect to the adjacent tracks become larger in a case of a disk small in track pitch because of the expanse, in a radial direction, of the recording magnetic section when a recording operation has been effected with excessive power. When the recording power range is expanded, information of the adjacent tracks is erased because of cross erasing and the track pitch cannot be made smaller, with a problem that the recording density cannot be made larger.

When the reading operation is effected with the use of a super resolution system of RAD or the like, it is necessary to adjust the intensity of the laser beams, the strength of the bias field, the area to be exchange coupled. in order to effect a high recording density operation. It is necessary to make the laser spot center conform to the central position of the temperature distribution so as to obtain sufficient reading signals in a wide range. But there is a problem that the high recording density operation is hard to effect so that the central position of the temperature distribution is moved in a progressing direction of a disk with respect to the laser spot center by the thermal conductivity in the reading and recording layer.

SUMMARY OF THE INVENTION

Accordingly, an object of the present invention is to realize an optical recording medium where the range of a recording power to be tolerated even in a case of a disk of a narrow track pitch is wide, and the movement of the central position of the temperature distribution is small, and more particularly, to a reliable optical recording medium capable of the higher density recording operation, where a recording power margin is larger.

In accomplishing these and other objects, according to one preferred embodiment of the present invention, there is an optical recording medium for recording reading, erasing information with beams comprising:

a substrate, a dielectric layer formed on the substrate, a reading and recording layer formed on the dielectric layer and composed of at least a read thin film and a recording thin film which are exchange coupled in piling up together, a layer made of lower thermal conductivity materials and formed on the reading and recording layers, and a heat sink layer made of higher thermal conductivity materials and formed on the layer made of lower thermal conductivity materials. Also there is provided an optical recording medium where a layer composed of a lower thermal conductivity material and a heat sink layer of a higher thermal conductivity material are sequentially laminated on a reading and recording layer of 80 nm or more in film thickness composed of at least a read film and a recording film in an optical recording medium for recording, reading, erasing the information with beams.

The optical recording medium is characterized in that it is composed of reading and recording layers for detecting information from the low temperature area within an optical spot, detecting information from a high temperature area or detecting information from a temperature area of a constant range grasped by a low temperature area and a high temperature area within the optical spot at the reading time of the information.

In the optical recording medium, the reading and recording layers is composed of at least one thin film is composed of a perpendicular magnetization film of $1 \times 10^6$ erg/(s·cm·deg) or lower in thermal conductivity as a reading and recording layer or at least one recording film of the reading and recording layer is composed of a perpendicular magnetization film including a nonmetallic material.

It is a material of 3 or more in ratio between a thermal conductivity of a heat sink layer and a thermal conductivity of a lower thermal conductivity material layer. The thermal conductivity is $5 \times 10^6$ erg/(s·cm·deg) or more as the heat sink layer of the higher thermal conductivity material. Concretely, the material is an Al, Cu, Ag, Au, Be, Mg, Mo, W, Rh or its alloy, intermetallic compound or the like. A thermal conductivity is $2 \times 10^6$ erg/(s·cm·deg) or lower as a lower thermal conductivity material. Concretely, the material is silicon oxide, zinc sulfide, selenic zinc, tantalum oxide, silicon nitride, $2MgO \cdot SiO_2$, or its mixed material or the like.

The operation will be concretely described hereinafter. The present invention can realize an optical recording medium which can be used even in the reading of the high temperature portion by an exchange coupling film using a RAD system or the like because of wide range of the recording power to be tolerated, or smaller movement of the central position of the temperature distribution with respect to the laser spot center even in a case of disk smaller in track pitch by the above described construction, namely, a reliable optical recording medium where the recording power margin is large and the high density recording can be effected.

In addition, the present invention can realize a superior optical recording medium where the deterioration by the thermal diffusion in the reading and recording layers is small even when the recording, erasing operations have been repeatedly effected, and the reading and recording characteristics are stable and superior, because laser beams projected into at a recording time are likely to be diffused in a heat sink layer direction.

BRIEF DESCRIPTION OF THE DRAWINGS

These and other objects and features of the present invention will become apparent from the following description of the preferred embodiment thereof with reference to the accompanying drawings, in which.

DETAILED DESCRIPTION OF THE INVENTION

Figure 1:
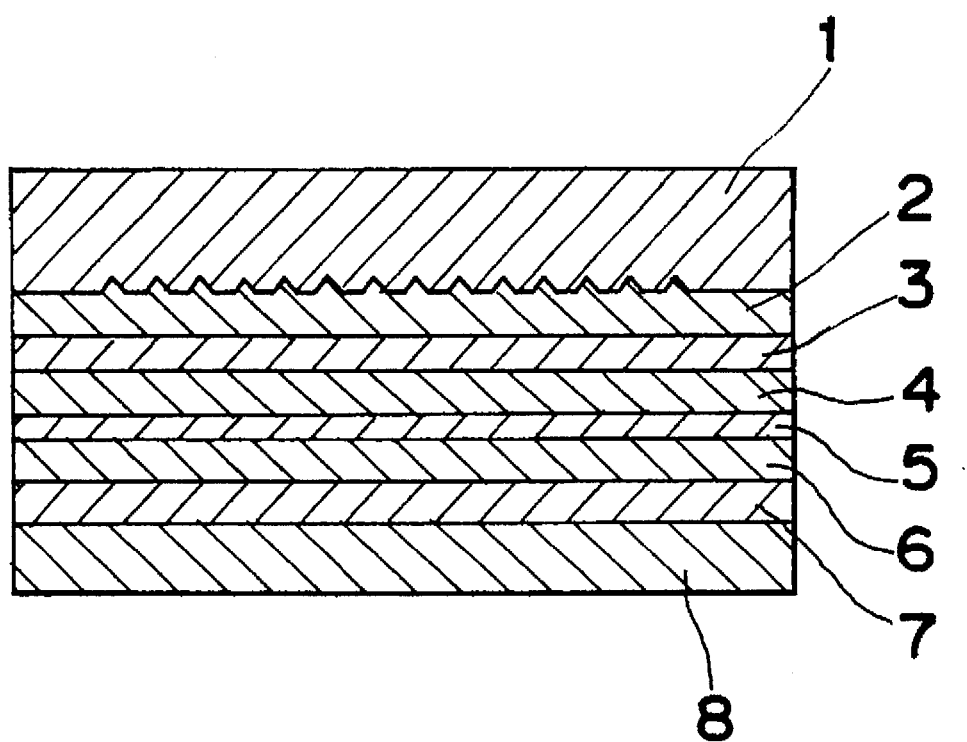
FIG. 1 is a construction view of an optical recording medium in a first embodiment of the present invention.

Before the description of the present invention proceeds, it is to be noted that like parts are designated by like reference numerals throughout the accompanying drawings.

An optical recording medium in a first embodiment of the present invention will be described hereinafter with reference to the drawings.

FIG. 1 shows a construction view of as optical recording medium in a first embodiment of the present invention. In FIG. 1, reference numeral 1 is a substrate of polycarbonate provided with grooves for tracking guide of an optical spots. Reference numeral 2 is a dielectric layer, for enhancing, composed of ZnS. Reference numerals 3 and 4 are respectively a two-layer construction of reading and recording layers formed of a perpendicular magnetization film composed of reading the TbFe layer and recording the GdTbFeCo. Reference numeral 5 is a lower thermal conductivity material layer composed of ZnS. Reference numeral 6 is a heat sink layer of a higher thermal conductivity material composed of AlTi. Reference numeral 7 is a protective layer of $ZnS \cdot SiO_2$. Reference numeral 8 is an overcoat layer of epoxy acrylate.

A substrate 1 of polycarbonate is formed of spiral shaped tracking guide grooves of 1.2 μm in pitch and pit strings for address use by an injection compression molding. A dielectric layer 2 of ZnS is film-formed on the substrate plate 1 into 80 nm in film thickness by a RF magnetron sputtering method. It is a two-layer film construction of reading and recording layers of exchange coupling with a reading film of GdTbFeCo of 40 nm, and a recording film 4 of TbFe of 60 nm being formed sequentially on it for making the signal amount larger at the loading time. They are respectively film-formed by a DC magnetron sputtering method.

The film is formed by a RF magnetron sputtering method so that a lower thermal conductivity material layer 5 of ZnS may become 20 nm in film thickness on it. A heat sink layer 6 of a higher thermal conductivity material composed of AlTi on it is film-formed into 100 nm, by a DC magnetron sputtering, with the use of an AlTi alloy target. A $ZnS.SiO_2$ protective layer 7 of 100 nm is film-formed on it by a RF magnetron sputtering method. An overcoat of epoxy acrylate of 8 is applied to thickness of 4 µm by a spin coat after epoxy acrylate resin has been dropped on the protective layer 7 and is hardened by the irradiation of ultraviolet rays by a metallic halide lamp.

In such reading and recording layers 3 and 4, the total of the film thickness becomes 100 nm. A reading signal from the recording film 4 through a reading film 3 becomes reading and recording layers of a construction of 3% with respect to the signal amount of the read film 3.

In the present embodiment, the expanse in the read a reading layer direction of the recording magnetic domain can be restrained even when a recording operation has been effected with an excessive recording power on a disk of a narrow track pitch by the construction with the higher conductivity material AlTi being laminated by 100 nm as a heat sink layer 6 through a layer 5 composed of 20 nm in ZnS lower thermal conductivity material on the reading and recording layers 3, and 4 of such construction. An optical recording medium can be realized which is as superior as 0.6 µm or lower in a recording domain length.

Figure 5:
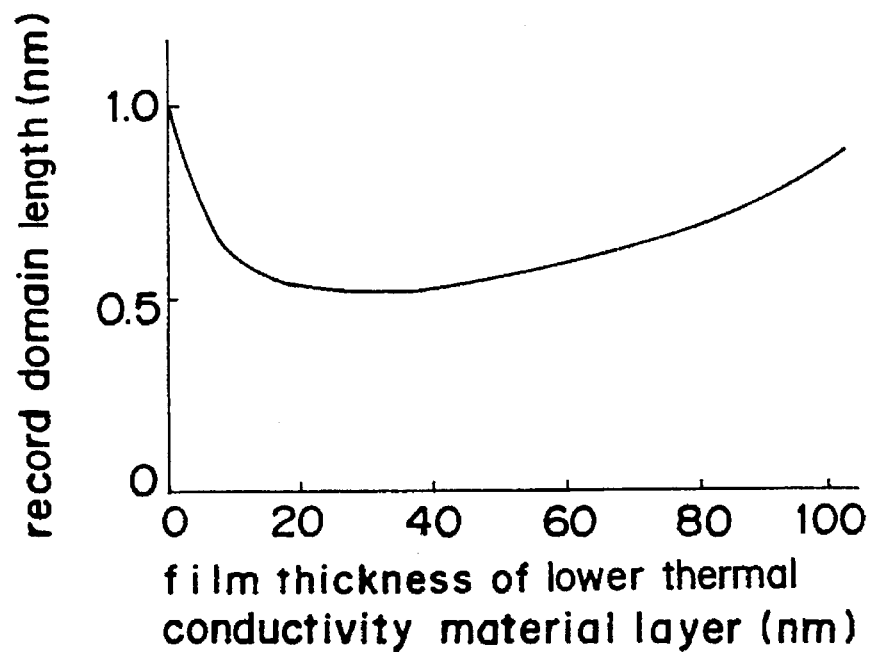
FIG. 5 is a relation graph between the length of the recording magnetic domain along by track at half a value of the highest raised temperature of the reading and recording layer of an optical recording medium in the embodiment of the present invention and a film thickness of the lower thermal conductivity material layer.

The relation between the length of the recording magnetic domain at half a value of the highest raised temperature of the reading and recording layers 3, 4, and the film thickness 5 of the lower thermal conductivity material layer; when a recording operation has been effected with a normalized recording power in FIG. 5. As shown in FIG. 5, the expanse of the recording magnetic domain is restrained through a lower thermal conductivity material layer 5 as compared with a case where a heat sink layer 6 of the higher thermal conductivity material laminated directly on the reading and recording layers 3 and 4. The thermal conductivity of the lower thermal conductivity material layer 5 is $1\times10^6$ erg/(s·cm·deg). When the film thickness is 5 nm or more and 90 nm or lower, an effect of restraining the expanse of the recording magnetic domain becomes extremely large. A similar effect is obtained if the thermal conductivity of the lower conductivity material layer 5 is less than a value of $2\times10^6$ erg/(s.cm.deg).

Figure 6:
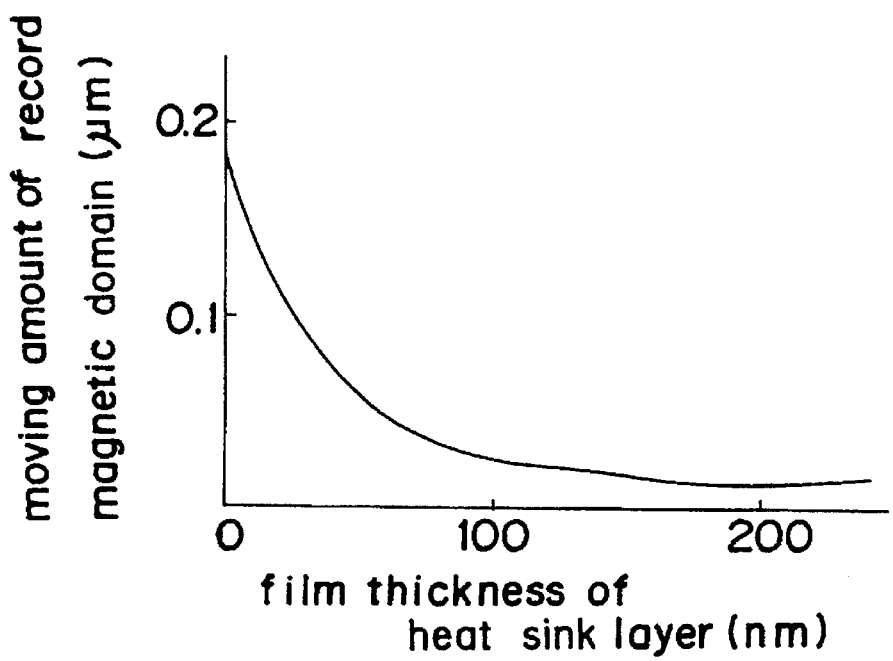
FIG. 6 is a relation graph between the movement amount of the central position of the recording magnetic domain of the optical recording medium in the embodiment of the present invention and the film thickness of the heat sink layer of the higher thermal conductivity material.

FIG. 6 shows a relation graph between the movement amount of the central position of the temperature distribution of the recording magnetic domain and the film thickness of the heat sink layer 6 of the higher conductivity material. As shown in FIG. 6, the moving amount of the recording magnetic domain becomes smaller as the film thickness of the heat sink layer 6 becomes thicker. The film thickness of 50 nm or larger is required as the movement of the recording magnetic domain is made 0.05 µm or lower.

Figure 7:
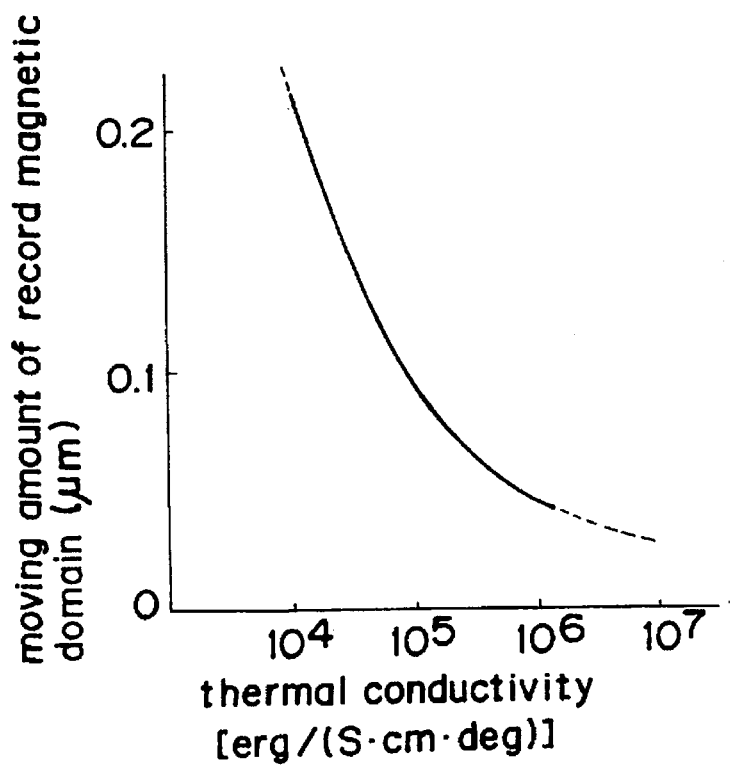
FIG. 7 is a relation graph between the movement amount of the central position of the recording magnetic domain of the optical recording medium in the embodiment of the present invention and the thermal conductivity of the hear sink layer of the higher thermal conductivity material.

FIG. 7 shows a relational graph between the movement amount of the central position of the recording domain and the thermal conductivity of the heat sink layer 6 of the higher thermal conductivity material. Although the thermal conductivity can be varied by the ratio of mixing Ti and Al, the movement of the recording magnetic domain becomes smaller as the thermal conductivity of the higher thermal conductivity material using a heat sink layer 6 is larger as shown in FIG. 7. The thermal conductivity of the higher thermal conductivity material is made $5\times10^6$ erg/(s·cm·deg) or more so that the effect of making the movement of the recording magnetic domain smaller, for instance, a distance less than a value of 0.05 µm is obtained. If the film thickness of the heat sink layer is made 50 nm or more, an effect of restraining the movement amount of the recording magnetic domain becomes further larger.

In a disk construction where the expanse of the recording magnetic domain is restrained and the central position of the temperature distribution is hardly moved when a recording operation is effected with excessive recording power on a disk small in track pitch, the lower thermal conductivity material where a thermal conductivity is $2\times10^6$ erg/(s·cm·deg) or lower has been film formed on the film thickness of 5 nm or more and 90 nm or lower on the reading and recording layers, and thereafter, a higher thermal conductivity material of AlTi, or a mixture of the other materials where the thermal conductivity is $5\times10^6$ erg/(s·cm·deg) or more or its mixed material or the like have only to be laminated on the reading and recording layers. A similar effect is obtained even when the thermal conductivity of the reading and recording layers is different as the ratio between the thermal conductivity of the heat sink layer and the thermal conductivity of the lower conductivity material layer is 3 or more.

In the present embodiment, the recording magnetic domain is hardly to expand in a radial direction, because the heat from the laser beams irradiated is likely to be absorbed in a direction of the heat sink layer 6 by a construction that the higher thermal conductivity material AlTi of 100 nm is used as the heat sink layer 6 through a layer 5 composed of the lower thermal conductivity material ZnS of 20 nm. The central position of the temperature distribution at this time becomes hardly to move even from a position where the laser beams have been irradiated by a construction using the heat sink layer 6. As the result, a superior optical recording medium can be realized where the expanse of the recording magnetic domain length is 0.6 µm or lower when a recording operation has been effected with excessive recording power on the disk of the narrow track pitch.

A second embodiment of the present invention will be described hereinafter with reference to the drawings.

Figure 2:
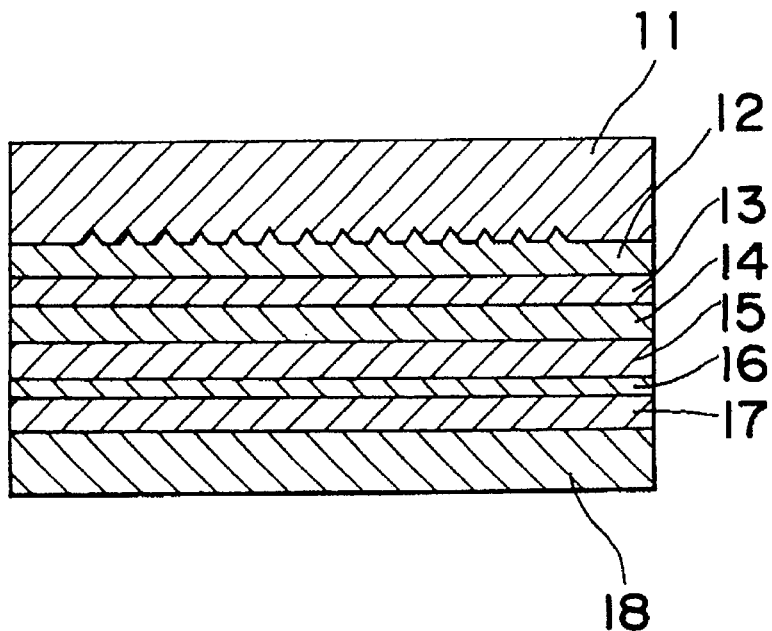
FIG. 2 is a construction view of an optical recording medium in a second embodiment of the present invention.

FIG. 2 shows a construction view of an optical recording medium in the second embodiment of the present invention. In FIG. 2, reference numeral 11 is a policarbonate substrate provided with grooves for tracking guide of optical spots. Reference numeral 12 is a dielectric layer of $Si_3N_4$. Reference numerals 13, 14, 15 are respectively reading and recording layers of three-layer film made of a perpendicular magnetization films of GdTbFe, TbFe, TbFeCo. Reference numeral 16 is a lower thermal conductivity material layer of $Si_2N_4$. Reference numeral 17 is a heat sink laser of the higher thermal conductivity material of Cu. Reference numeral 18 is an overcoat layer of urethane resin.

The above described substrate 11 of the polycarbonate is formed of grooves of a spiral shaped tracking guide of 1.1 µm in pitch and pit strings for address use by an injection compression molding. The $Si_2N_4$ dielectric layer 12 is film formed into 100 nm with a reactive RF magnetron sputtering method.

On it, a GdFeCo film 40 nm of a reading layer 13, a TbFe film 10 nm of a intermediate film 14, a TbFeCo layer 50 nm of a recording film 15 are sequentially film formed respectively by a DC magnetron sputtering method.

Further, on it a lower thermal conductivity material layer 16 of $Si_3N_4$ is film formed by a reactive RF magnetron sputtering method into film thickness 40 nm. On it, a heat sink layer 17 of the higher thermal conductivity material of Cu is film formed into 80 nm, with the use of a Cu target, by a DC magnetron sputtering method. On it, in order to form the overcoat layer 18 of the urethane resin, the urethane resin is dropped directly onto the heat sink layer 17 of an Cu higher thermal conductivity material, thereafter is applied into the thickness of 4 nm by a spin coat, and ultraviolet rays are irradiated by a metal halide lamp so as to harden it.

Reading and recording layers composed of the reading layer 13, the switching film 14 and the recording film 15 is a method of increasing the recording density using a super resolution system (hereinafter FAD system) called a FAD system, and reading and recording layers of exchange coupled three-layer for making a loading signal amount larger in a case of higher density recording, reading operation of 0.5 μm or lower in domain length at the reading time by the reading operation of the information from only the lower temperature area within the optical spot. Thus, a GdFeCo film which is as small as 200 oe in coercive force is used in the reading layer 13. The reading principle by the FAD system will be described hereinafter.

The reading operation by the FAD system is effected with laser power higher than normal while applying a bias field. Although the temperature of the reading layer 13 rises gradually when the disk is rotated and passes the laser spots at the reading operation time. The total of the exchange coupling force and the coercive force of the reading layer 13 becomes larger than in the bias field at the reading time because of larger exchange coupling force in the lower temperature area where the temperature of the forward switching film 14 within the optical spot is comparatively lower at a curie temperature or lower. Therefore, the magnetization of the recording film 15 is copied as it is on the reading layer 13. On the other hand, as the higher temperature area behind the laser spot becomes a curie temperature or more in the temperature of the switching film 14, the exchange coupling force between the reading layer 13 and the recording film 15 becomes weaker and the magnetization of the reading layer 13 small in the coercive force is arranged in the direction of the bias field so as to erase the information of reading layer. Thus, the reading layer 13 operates as a mask.

In the FAD system, the switching film 14 within the optical spot at the reading time is portion out of a mask at the low temperature area, comparatively low, of the curie temperature or lower so that the information of the recording film 15 only from the super resolution detecting area is read, and the size of the optical spot becomes effectively smaller. After the laser beams have passed, the temperature of the reading and recording layers becomes lowered so that the recording domain of the recording film 15 is copied on the reading layer 13 so as to return to the original condition. In the magneto-optical recording medium of the construction, recording and reading operations of 0.5 μm or lower in domain length can be effected.

In the reading and recording layers of the present embodiment, the total of the film thickness is 100 nm and the reading layer 13 functions as a mask so that the reading signal amount from the recording film 15 through the reading layer 13 is adapted to become 2.5%.

In the FAD system, sufficient read signal can be actually obtained only in the range of the extremely narrow setting conditions at the reading operation time, because the intensity of the laser beams the strength of the bias field, and an area to be exchange coupled are required.

As described in the present embodiment, a construction of lamination by 80 nm of higher thermal conductivity material Cu as a heat sink layer 17, through lower thermal conductivity material layer 16, 40 nm, of $Si_2N_4$, is provided on the reading and recording layers 13, 14, 15 provided on the dielectric layer formed on the substrate. Since the expanse of the recording magnetic section is 0.4 μm or lower even when a recording operation has been effected on a disk smaller in track pitch. And the moving amount of the central position of the temperature distribution with respect to the optical spot center of the laser which becomes important especially at the higher density reading time is also 0.04 μm or lower, the setting operation of the reading power can be easily effected, thus realizing a superior optical recording medium.

A recording medium is an optical recording medium which is adapted to record, read, erase the information with beams, and to detect from the low temperature within the optical spot at an information reading operation. A layer composed of a lower thermal conductivity material and a heat sink layer of a higher thermal conductivity material are sequentially laminated on reading and recording layers so that an optical recording medium where the range of the recording power to be tolerated even when the track pitch is smaller is wider and the moving amount of the central position of the temperature distribution is smaller with respect to the laser spot center, namely, a reliable optical recording medium where the recording power margin is larger and a high density recording operation can be effected can be realized.

A third embodiment of the present invention will be described hereinafter with reference to the drawings.

Figure 3:
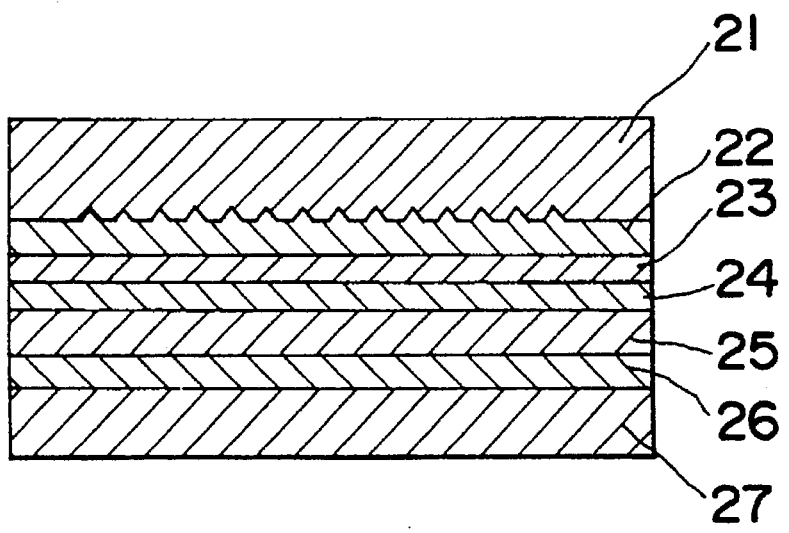
FIG. 3 is a construction view of an optical recording medium in a third embodiment of the present invention.

FIG. 3 shows a construction view of an optical recording medium in a third embodiment of the present invention. In FIG. 3, reference numeral 21 is a polyolefin substrate provided with grooves for tracking guide of optical spots. Reference numeral 22 is a dielectric layer of $Si_3N_4$. Reference numerals 23 and 24 are respectively reading and recording layers formed of perpendicular magnetization two-layer films of GdTbFe, TbFeCoC. Reference numeral 25 is a lower thermal conductivity material layer of $Si_3N_4$. Reference numeral 26 is a heat sink layer of a higher thermal conductivity material of W. Reference numeral 27 is an overcoat layer of urethane resign.

A substrate 21 of the polyolefin is formed of spirally shaped tracking guide of grooves 1.1 μm in pitch and pit strings for address use by an injection compression molding. The $Si_3N_4$ dielectric layer of 22 is film-formed into 100 nm by a reactive RF magnetron sputtering method.

On it, a GdFeCo film 40 nm of the reading layer 23, a TbFeCoC film 50 nm of the recording film 24 added with C of 1 at % in order to make the thermal conductivity small are sequentially film formed respectively by a DC magnetron sputtering method.

On it, a lower thermal conductivity material layer 25 of $Si_3N_4$ is film formed by a reactive RF magnetron sputtering method into a film thickness 20 nm. On it, a heat sink layer 26 of the higher thermal conductivity material of W is film formed into 100 nm by a DC magnetron sputtering method with the use of a W target. On it, in order to form an overcoat layer 27 of urethane resin, the urethane resin is dropped directly on the heat sink layer 26 of the higher thermal conductivity material W and thereafter is applied into the thickness of 4 μm by a spin coat, and ultraviolet rays are irradiated by the metal halide lamp so as to harden it.

Reading and recording layers composed of 23, 24 is a method of making the recording density larger, using the RAD system, and reading and recording layers of exchange coupled two-layer for making the reading signal amount larger in a case of high density recording and reading operation of 0.6 μm or lower in domain length at the reading operation. A reading principle by the RAD system will be briefly described. An initial magnetic field is arranged immediately before the laser spot and the direction of the magnetization of the reading layer 23 is arranged in a direction of the initial magnetic field. At this time, the reading layer 23 operates as a mask. When the disk is read and passes the laser spot at the reading time, the temperature of the reading layer 23 rises gradually and the high temperature area behind the laser spot is considerably lowered in the coercive force of the reading layer 23. When the total of the exchange coupling force with respect to the recording film 24 and the bias field at the reading operation time becomes larger than the coercive force of the reading layer 23, the magnetization of the recording film 24 is copied. The information of the recording film 24 is read from a portion of a mask of the film 23. The direction of the bias field is opposite to the initial magnetic field. After the laser beams have been passed, the temperature of the reading layer 23 is lowered again and the domain of the recording film 24 is copied on the reading layer 23 and is restored to the original condition. In the magneto-optical recording medium of this construction, recording, reading operations 0.6 μm in domain length along by track can be effected. In the reading and recording layers of the present embodiment, the total of the film thickness is 90 nm and the reading signal amount from the recording film 24 through the reading layer 23 is 3% in construction, because the reading layer 23 operates as a mask.

In the RAD system, the intensity of the laser beams at the reading time, the strength of the bias field and the area to be exchanged, coupled are required to be adjusted. Actually only sufficient reading signal can be obtained in the range extremely narrow setting conditions.

As described in the present embodiment, a construction of lamination by 100 nm of a higher thermal conductivity material W as a heat sink layer 26, through a lower thermal conductivity material layer 25, 20 nm, of $Si_3N_4$, is provided on the reading and recording layers 23, 24 provided on the dielectric layer formed on the substrate. Since the expanse of the recording magnetic domain length is 0.4 μm or lower even when a recording operation has been effected on a disk smaller in track pitch with excessive recording power or the moving amount of the central position of the temperature distribution with respect to the optical spot center of the laser which becomes important especially at the higher density reading time is also 0.03 μm or lower, so that the setting operation of the reading power can be easily effected, thus realizing a superior optical recording medium.

Figure 8:
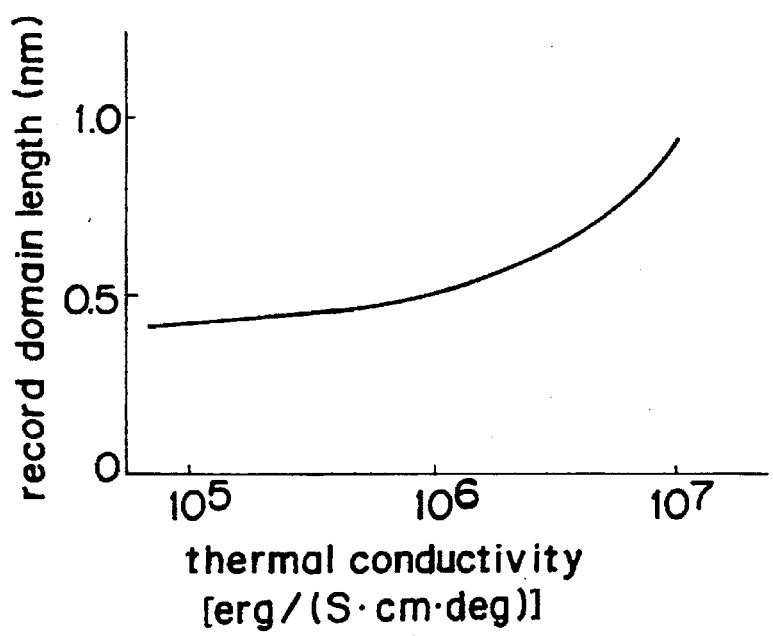
FIG. 8 is a relation graph between the length of the recording magnetic domain along by track of the optical recording medium in the embodiment of the present invention and the thermal conductivity of the reading and recording layers.
Figure 9:
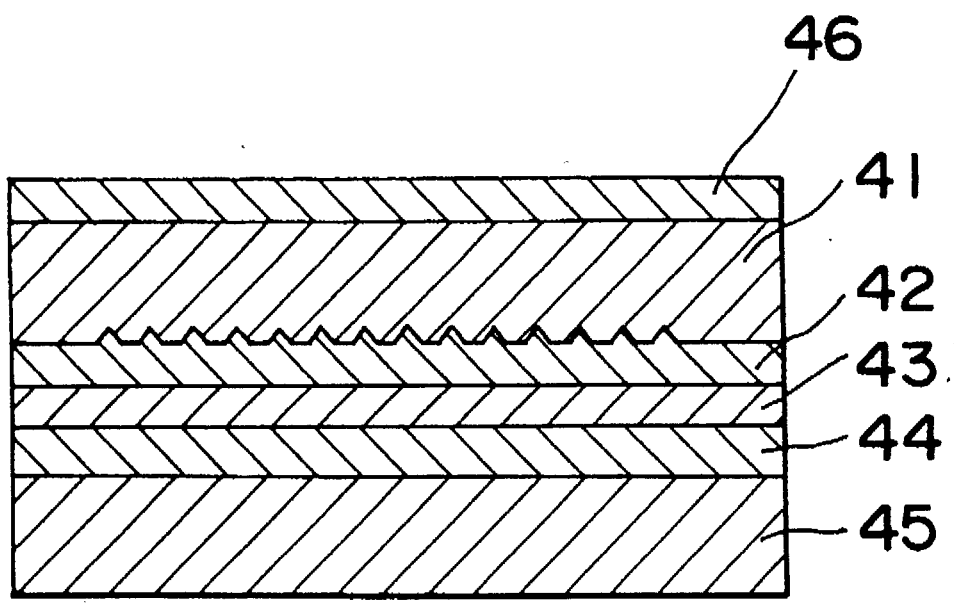
FIG. 9 is a construction view of the conventional optical recording medium.

FIG. 8 shows the relationship between the length of the recording magnetic domain at half a value of the highest raised temperature of the reading and recording layers 23, 24 and the thermal conductivity of the recording film 24 when a recording operation has been effected with a normalized recording power in FIG. 8. The thermal conductivity of the recording film 24 can be varied by the addition of the nonmetallic material. The expanse of the recording magnetic domain can be restrained by making the thermal conductivity of the reading and recording film 24 smaller as in FIG. 8. When a heat sink layer 26 of the higher thermal conductivity material is provided through the lower thermal conductivity material layer 25 at this time, an effect of restraining the expanse of the recording magnetic domain becomes extremely larger. Make the thermal conductivity of the reading and recording layers $1\times10^6$ erg/(s·cm·deg) or lower, and an effect of restraining the expanse of the recording domain becomes further larger in the case of the recording domain length of 0.6 μm or lower.

The perpendicular magnetization film of the coercive force of 10 koe is used as the reading and recording layer 23 of the present embodiment. A similar effect is obtained if a perpendicular magnetization film TbFeCoC of 10 Koe or more in coercive force and of $1\times10^6$ erg/(s·cm·deg) or lower in thermal conductivity.

Reading and recording layers 23, 24 is used where thermal conductivity composed of TbFeCoC film 50 nm which is film-formed on reading layer 23, a film where C is added by lat. % to the TbFeCo is made smaller is used. The lower thermal conductivity layer 25 composed of $Si_3N_4$ film 20 nm and the heat sink layer 26 made of higher thermal conductivity material W 100 μm are sequentially provided. The expanse of the recording magnetic domain length when the recording operation is effected with excessive power is 0.5 μm or lower. As the heat conduction is small within the film of the reading and recording layers, the moving amount of the central position of the temperature distribution with respect to the position where the laser beams have been irradiated is 0.03 μm or lower, thus realizing a superior optical recording medium.

A recording medium is an optical recording medium which is adapted to record, read, erase the information with beams, and to detect from the high temperature area within the optical spot at an information reading operation. A layer composed of a lower thermal conductivity material and a heat sink layer of a higher thermal conductivity material are sequentially laminated on reading and recording layers including a recording thin film having a thermal conductivity of less than $1\times10^6$ erg/(s·cm·deg) so that an optical recording medium where the range of the recording power to be tolerated even when the track pitch is smaller is wider and the moving amount of the central position of the temperature distribution is smaller with respect to the laser spot center can be realized, namely, a reliable optical recording medium where the recording power margin is larger and a high density recording operation can be effected can be realized.

A fourth embodiment of the present invention will be described hereinafter with reference to the drawings.

Figure 4:
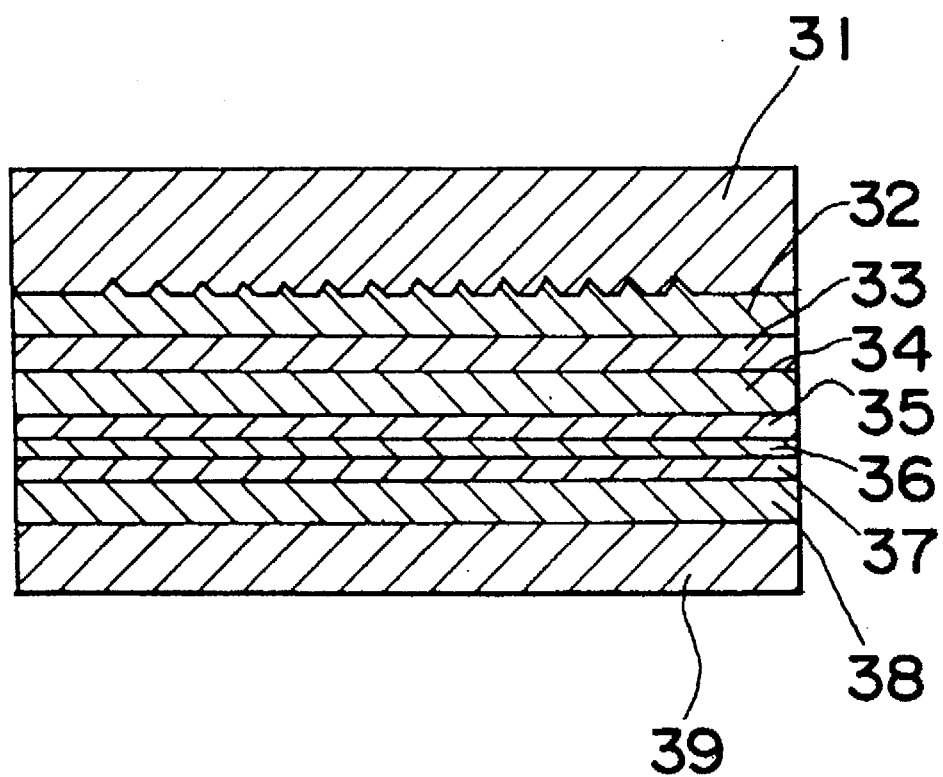
FIG. 4 is a construction view of an optical recording medium in a fourth embodiment of the present embodiment.

FIG. 4 shows a construction view of an optical recording medium in the fourth embodiment of the present invention. In FIG. 4, reference numeral 31 is a polyolefin substrate in provided with grooves for tracking guide of optical spots. Reference numeral 32 is a dielectric layer, for enhance, composed of $ZnS.SiO_2$. Reference numeral 33 is a reading layer of GdFeCo. Reference numeral 34 is a reading assistant film of the TbFeCo. Reference numeral 35 is a intermediate layer of the GdFeCo. Reference numeral 36 is a recording film of the TbFeCo. Reading and recording layers formed of four-layer construction of perpendicular magnetization films 33, 34, 35, 36. Reference numeral 37 is a lower thermal conductivity material layer of $Zns.SiO_2$. Reference numeral 38 is a heat sink layer of a higher thermal conductivity material of AlRh. Reference numeral 39 is an overcoat layer of epoxy acrylate.

A substrate 31 of the polyolefin is formed of spiral-shaped tracking guide of 1.1 μm in pitch and pit strings for address use by an injection compression molding. The $ZnS.SiO_2$ dielectric layer of 32 is film-formed into 100 nm by a RF magnetron sputtering method.

On it, there are reading and recording layers of four-layer construction formed of a GdFeCo film 40 nm of a reading layer 33, a TbFeCo film 10 nm of a reading assistant film 34, a GdFeCo film 25 nm of a switching film 35, a TbFeCo film 50 nm of a recording film 36, and they are respectively film formed sequentially by a DC magnetron sputtering method.

On it, a lower thermal conductivity material layer 37 of $ZnS.SiO_2$ is film formed by a RF magnetron sputtering method into a film thickness 30 nm. On it, a heat sink layer 38 of a higher thermal conductivity material of AlRh is film formed into 120 nm by a DC magnetron sputtering method with the use of an AlRh alloy target. On it, in order to form an overcoat layer 39 of epoxy acrylate, the epoxy acrylate is dropped directly onto the heat sink layer 38 of the higher thermal conductivity material AlRh and thereafter is applied into the thickness of 4 µm by a spin coat, and ultraviolet rays are irradiated by the metal halide lamp so as to harden it.

Reading and recording layers composed of 33, 34, 35, 36 is a method of making the recording density larger, using the super resolution system (hereinafter referred to as DAD system) called DAD, and of reading and recording layers of exchange coupled multi-layer for making the reading signal amount larger in a case of high density recording and reading operation of 0.4 µm or lower in domain length at the reading operation time. Therefore, a GdFeCo film as small in coercive force as 100 oe is used for the reading layer 33. The reading principle by the DAD system will be briefly described hereinafter.

Assume in the reading and recording layer of the optical medium by the DAD system that the coercive force is Hc1, the curie temperature is Tc1 in a two-layer film of the reading layer 33 and the reading assistant film 34, the curie temperature of a switching film 35 is Tcm, a coercive force of the recording film 36 is Hc2, the curie temperature is Tc2 of the recording film 36, the magnetic field by an initial magnet is Hini, a bias field at a reading time is Hr, the relation of $$Hc1+Hw1<Hini$$

$$Hc2-Hw2>Hini$$

is required in a room temperature, the relation of $$Hc1-Hw1<Hr$$

$$Hc1+Hw1>Hr$$

is required in the high temperature of readable temperature or more, or the relation of $$Hc2>Hr$$

is always required in the temperature of the highest arrival temperature or lower in the reading and recording layers. The Hw1 is an effective magnetic field to be applied upon the reading layer 33 and the Hw2 is an effective magnetic field to be applied upon the recording film 36. In the present embodiment, Hc1=3 koe, Tc1=300° C., Tcm=250° C., Hc2= 10 koe, Tc2=250° C., Hini=4 koe. In the reading operation of the DAD system, a reading operation is effected with the laser power of higher by 2.5 mW than normal while applying the bias field Hr=200 oe so as to fill the above described relational equation.

An initial magnetic field is disposed immediately before the laser spot at the reading operation time in order to arrange the direction of the magnetization of the reading layer 33, the reading assistant layer 34, so that the front lower temperature area of the laser spot of the reading layer 33 operates as a mask by the DAD system. When the disk is rotated so as to pass the laser spot, the temperature of the reading and recording layers gradually increases. The read assistant film 34 reaches a curie temperature or more in the rear higher temperature area of the laser spot. By the application of the bias field, the reading layer 33 smaller in the coercive force is forced to be magnetized in the direction of the bias field. The front lower temperature area of the laser spot and the rear higher temperature area operate as masks in the DAD system. The total of the exchange coupling force between the reading layer 33 and the recording film 36 and the bias field at the read time becomes larger than the coercive force of the reading layer 33, the magnetization of the recording film 36 is copied. The information of the recording film 36 is read from only the portion between the mask of the lower temperature area and the mask of the higher temperature area of the reading layer 33. The direction of the bias field is opposite to the initial magnetic field. After the laser beams have passed, the temperature of the reading and recording layers is lowered and the recording domain of the recording film 36 is copied on the reading layer 33 so as to return to the original condition. In the optical magnetic recording medium of the construction, the recording and reading operations of 0.4 µm in domain length can be effected. The reading and recording layers of the present embodiment is 125 nm in the total of the film thickness. As the reading film 33 operates as a mask, the reading signal amount from the recording film 36 through the reading layer 33 is adapted to become 2%.

In the DAD system, the intensity of the laser beams at the reading time, the strength of the bias field and the area to be exchange coupled are required to be adjusted. Actually only sufficient read signal can be obtained in the range extremely narrow setting conditions.

As described in the present embodiment, a construction of lamination by a lower thermal conductivity material layer 37, 30 nm of $ZnS.SiO_2$ and a higher thermal conductivity material AlRh 120 nm as a heat sink layer 38 is provided on the reading and recording layers 33, 34, 35, 36. Since the expanse of the recording magnetic domain length is 0.3 µm or lower even when a recording operation has been effected on a disk smaller in track pitch with excessive recording power or the moving amount of the central position of the temperature distribution with respect to the optical spot center of the laser which becomes important especially at the higher density reading time is also 0.03 µm or lower, so that the setting operation of the reading power can be easily effected, thus realizing a superior optical recording medium.

A recording medium is an optical recording medium which is adapted to record, read, erase the information with beams. A layer composed of a lower thermal conductivity material and a heat sink layer of a higher thermal conductivity material are sequentially laminated on reading and recording layers so that an optical recording medium where the range of the recording power to be tolerated even when the track pitch is smaller is wider and the moving amount of the central position of the temperature distribution is smaller with respect to the laser spot center can be realized, namely, a reliable optical recording medium where the recording power margin is larger and a high density recording operation can be effected can be realized.

Although an optical recording medium using a polycarbonate or polyolefin substrate provided with grooves or prepits for tracking guide of the optical spots has been described in the present embodiment, acryl, epoxy or the other plastic substrate or a substrate provided with grooves or prepits for the tracking guide of the optical spots on glass may be used.

Also an optical recording medium using a dielectric layer of ZnS, $Si_3N_4$ or $ZnS.SiO_2$ has been described, a material of silicon oxide, selenic zinc, tantalum oxide, silicon nitride, 2 MgO.SiO$_2$, AlON, AlSiON or the like or a mixed material thereof may be used for a dielectric layer.

In the present embodiment, an optical recording medium using respectively an overcoat layer of epoxy acrylate, urethane resin in the heat sink layer directly without a protective layer, or through a protective layer of Zn S.SiO$_2$, or a hard coat layer of epoxy acrylate on a substrate surface on a side where the reading and recording layers is not formed. A material of silicon oxide, zinc sulfide, zinc selenide tantalum oxide, silicon nitride, 2 MgO.SiO$_2$, AlON, AlSiON or the like or a mixed material thereof are used for protective layer. Macro-molecule material to which epoxy resin, acrylic resin, epoxy acrylate and acrylic monomer, volatile solvent and so on are added are used respectively for the overcoat layer and the hard coat layer. Or the overcoat layer and the hard coat layer may use the combination of different materials.

Reading and recording layers are composed of a perpendicular magnetization film of rare-earth-transition-metal alloy different in material or composition, and an optical recording medium of 2% through 3.5% in a signal amount from a recording film through a reading layer with respect to the signal amount from the reading layer at an information reading operation has been described. The signal amount from the recording film has only to be composed of 4% or lower, because no influences are provided upon the signals from the reading film and the detection is hardly effected at the information reading time.

An optical recording medium composed of reading and recording layers composed of TbFeCo, GdTbFe, and the likes or a plurality of perpendicular magnetization films of rare-earth-transition-metal alloy is used for the reading and recording layers. Even if the layer is reading and recording layers including a magneto-optical recording material such as TbCo, GdCo, DyFeCo, PtCo, PtMnSn, MnBi or the like, a phase-change optical recording medium such as GeTeSb or the like or materials thereof, and a plurality of thin films different in material or composition. In order to effectively use the effect in the reading and recording layers such a large effect as in the present embodiment can be obtained if using an exchange coupling multi-layer film, and the total of the film thickness of the reading and recording layers is 80 nm or more.

An optical recording medium had been described where a layer composed of a lower thermal conductivity material of ZnS, Si$_3$N$_4$ or ZnS.SiO$_2$ and a heat sink layer of a higher thermal conductivity material of AlTi, Cu, W or AlRh are sequentially formed. An equal effect or more can be obtained if a material of 2×10$^6$ erg/(s·cm·deg) or lower, concretely, a layer composed of a material of film thickness of 5 nm or more and 90 nm or lower composed of silicon oxide, selenium zinc, tantalum oxide, silicon nitride, 2 MgO.SiO$_2$, or a mixed material thereof or the like is used as a heat sink layer for a layer composed of a lower thermal conductivity material or a material of 5×10$^6$ erg/(s·cm·deg) or lower, concretely, a layer composed of film thickness of 50 nm or more of a material of Cu, Ti, Ag, Au, Be, Mg, Mo, Rh, or alloy thereof, an intermetallic compound or the like is used as a heat sink layer. Even when the thermal conductivity of each material is varied in accordance with the thermal conductivity of the reading and recording layers, a similar effect is obtained if a ratio between the thermal conductivity of the heat sink layer and the thermal conductivity of the lower thermal conductivity material layer is 3 or more in a material.

Optical recording media are respectively described where a lower thermal conductivity material layer, a higher thermal conductivity material layer are respectively laminated sequentially on reading and recording layers composed of a plurality of perpendicular magnetization films different in material or composition or reading and recording layers where at least one recording film is 1×10$^6$ erg/(s·cm·deg) or lower in the present embodiment. An effect becomes much larger if it is an optical recording medium composed by a reading film or another thin film including a nonmetallic material or it is an optical recording medium composed of these thin films combined.

In the present embodiment, an optical medium using substrate of 1.1 μm through 1.3 μm in track pitch has been described. A larger effect can be obtained if it is an optical recording medium composed of substrate of 1.3 μm or lower in track pitch.

According to the present embodiment as described hereinabove, in an optical recording medium for recording, reading, erasing the information with beams, an optical recording medium for recording which comprises a substrate, a dielectric layer formed on the substrate, reading and recording layers formed on the dielectric layer and composed of at least a reading layer and a recording layer which are exchange coupled in piling up together, a layer made of lower thermal conductivity materials and formed on the reading and recording layer, and a heat sink layers made of higher thermal conductivity materials and formed on the layer made of lower thermal conductivity materials. In the optical recording medium, the reading and recording layers are adapted to detect reading signals from lower temperature area, higher temperature area, an area portion between the lower temperature area and higher temperature area within optical spots at the time of reading information. Also, at least one thin film of the reading and recording layer is made of a nonmetallic perpendicular magnetization film with rare-earth metal and transmission metal being principal components, is composed of the reading layer having a coercive force of less than 1 koe, and of a perpendicular magnetization film having a thermal conductivity of less than a value of [1×10$^6$ erg/(s·cm·deg)], and is included with a nonmetallic material. Further, an optical recording medium where the range of the recording power to be tolerated is wide even when the track pitch is small and the movement amount in a central position of the temperature distribution is small with respect to the laser spot center, namely, an optical recording medium where recording power margin is large and higher density recording operation can be effected by an optical recording medium where a layer composed of a lower thermal conductivity material and a heat sink layer of a higher thermal conductivity material are laminated sequentially on the reading and recording layers.

With the above construction, the present invention can be presented the optical recording medium with high reliability capable for recording in high density with a large recording power margin, with the moving amount of center position in the temperature distribution against the laser spot center being small, and with the range of recording power to be allowed in the case of small track pitch being broadened. In addition, it can be created the optical recording medium having a stable and superior property for reading and recording where the deterioration to be caused by thermal diffusion among the reading and recording layers are small even in the case of repeating the operation of recording and erasing, because of facilitating the thermal diffusion dispersion of the laser light incident is recording in the direction of heat absorption layer.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An optical recording medium comprising in the following order:

a substrate;

a dielectric layer formed on the substrate;

a reading layer formed on the dielectric layer;

a recording layer mutually exchange-coupled to the reading layer;

a layer made of lower thermal conductivity materials having a thermal conductivity of less than a value of $2 \times 10^6$ erg/(s·cm·deg) and formed on the recording layer;

a heat sink layer made of higher thermal conductivity materials having a thermal conductivity of more than a value of $5 \times 10^6$ erg/(s·cm·deg) and formed on the layer made of lower thermal conductivity materials; and wherein the combined thickness of the reading and recording layers is at least 80 nm.

2. The optical recording medium as defined in claim 1, wherein at least one intermediate layer is interposed between said reading layer and said recording layer.

3. The optical recording medium as defined in claim 1, wherein said reading and recording layers are capable of detecting reading signals from a lower temperature area within an optical spot at the time of reading information.

4. The optical recording medium as defined in claim 1, wherein said reading and recording layers are capable of detecting reading signals from a higher temperature area within an optical spot at the time of reading information.

5. The optical recording medium as defined in claim 1, wherein said reading and recording layers are capable of detecting reading signals from an area between a lower temperature area and higher temperature area within an optical spot at the time of reading information.

6. The optical recording medium as defined in claim 1, wherein more than one of the reading and recording layers is made of an amorphous material with perpendicular magnetization comprised of a rare-earth metal and transition metal as principal components.

7. The optical recording medium as defined in claim 1, wherein the reading layer has a magnetic coercive force of less than 1 koe.

8. The optical recording medium as defined in claim 1, wherein more than one of the reading and recording layers is composed of an amorphous perpendicular magnetization layer having a thermal conductivity of less than a value of $1 \times 10^6$ erg/(s·cm·deg).

9. The optical recording medium as defined in claim 1, wherein more than one of the reading and recording layers includes a nonmetallic material.

10. The optical recording medium as defined in claim 1, wherein said heat sink layer made of higher thermal conductivity materials is made of:

a metal composed of a material selected from the group consisting of Al, Ag, Au, Be, Mg, Mo, W, and Rh; or an alloy of two or more elements selected from the group consisting of Al, Ag, Au, Be, Mg, Mo, W, and Rh; or an intermetallic compound composed of two or more elements selected from the group consisting of Al, Ag, Au, Be, Mg, Mo, W, and Rh.

11. The optical recording medium as defined in claim 1, wherein said lower thermal conductivity material is composed of a material selected from the group consisting of silicon oxide, zinc sulfide, zinc selenite, tantalum oxide, silicon nitride, aluminum nitride, 2 MgO–SiO$_2$, and mixtures thereof.

12. The optical recording medium as defined in claim 1, wherein the substrate is provided with a track pitch having a value of less than 1.3 μm.

13. An optical recording medium comprising:

a substrate;

a dielectric layer formed on the substrate;

a reading layer formed on the dielectric layer;

a switching layer formed on the reading layer;

a recording layer formed on the switching layer;

a lower thermal conductivity layer made of a material having a thermal conductivity of less than $2 \times 10^6$ erg/(s·cm·deg) formed on the recording layer;

a heat sink layer made of a material having a thermal conductivity of more than $5 \times 10^6$ erg/(s·cm·deg) formed on the lower thermal conductivity layer; and wherein the combined thickness of the reading and recording layers is at least 80 nm.

14. An optical recording medium comprising:

a substrate;

a dielectric layer formed on the substrate;

a reading layer formed on the dielectric layer;

a read assistant layer formed on the reading layer;

a switching layer formed on the read assistant layer;

a recording layer formed on the switching layer;

a lower thermal conductivity layer made of a material having a thermal conductivity of less than $2 \times 10^6$ erg/(s·cm·deg) formed on the recording layer;

a heat sink layer made of a material having a thermal conductivity of more than $5 \times 10^6$ erg/(s·cm·deg) formed on the lower thermal conductivity layer; and wherein the combined thickness of the reading and recording layers is at least 80 nm.

* * * * *